Patented Jan. 12, 1926.

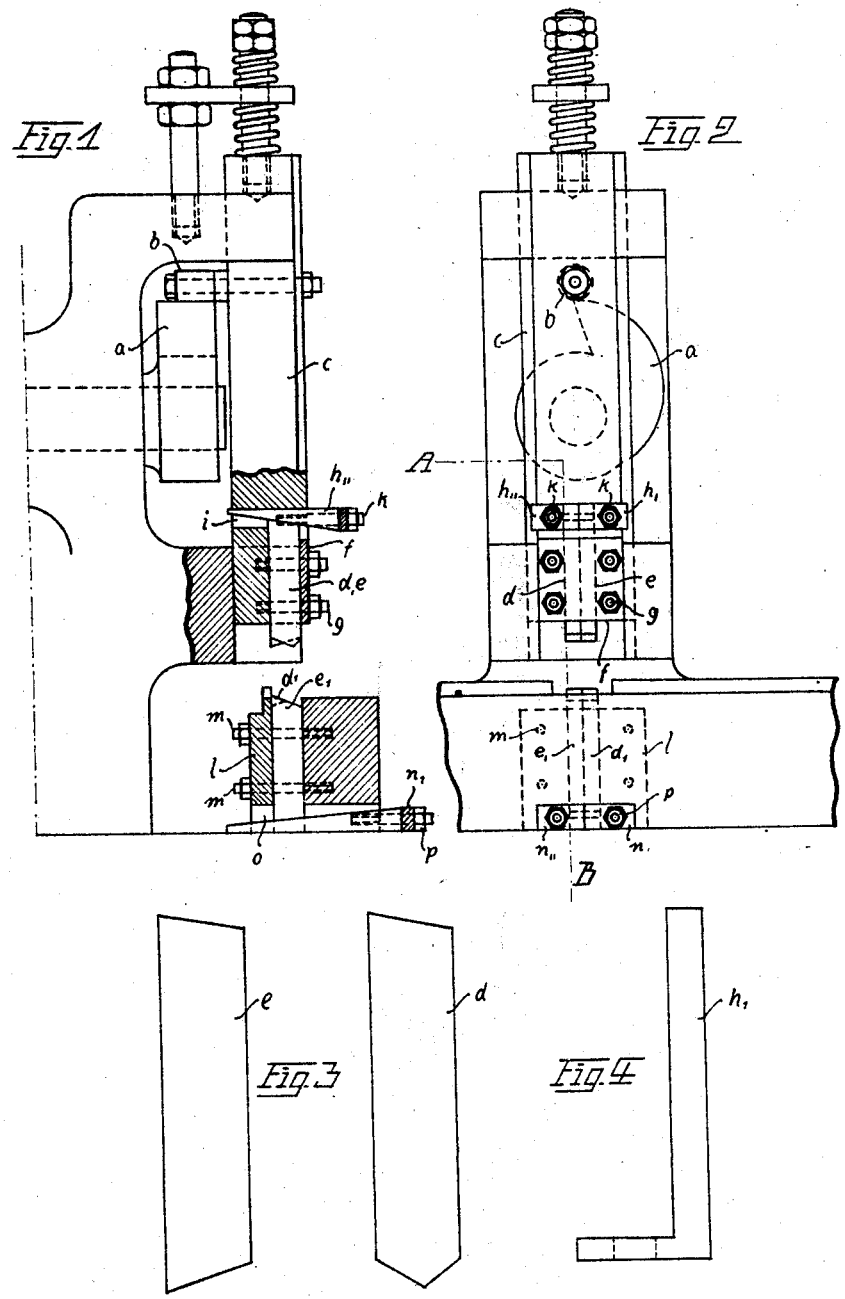

1,569,023

UNITED STATES PATENT OFFICE.

FRITZ KOCH AND RICHARD POHLMANN, OF CRONENBERG, GERMANY.

SAW-SETTING MACHINE.

Application filed February 20, 1925. Serial No. 10,653.

*To all whom it may concern:*

Be it known that we, FRITZ KOCH, a citizen of Germany, and residing at 35 Heidterstrasse, Cronenberg, Rheinland, Germany, and RICHARD POHLMANN, a citizen of Germany, and residing at 37 Heidterstrasse, Cronenberg, Rheinland, Germany, have invented certain new and useful Improvements in a Saw-Setting Machine (for which we have filed application in Germany, 11th February, 1924), of which the following is a specification.

The invention provides the hereinafter described and claimed improved saw setting machine.

Saw setting machines are known in which several teeth are set at the same time. The punches and dies used with these known machines are made in one piece and saw setting accomplished with tools of the known type calls for great accuracy and much time is wasted in making adjustment.

The object of the invention is a machine to overcome the disadvantages stated and costly punches and dies are avoided by the punch and the die being made adjustable independently of each other by two wedges.

In the annexed drawings a desirable embodiment is illustrated.

Fig. 1 is a view of the machine in part section along the line A. B. of Fig. 2 which is a front view of the machine.

Fig. 3 illustrates the two parts for the die and punch.

Fig. 4 is a top view of the wedge.

Mounted upon a known machine is a revoluble cam $a$ adapted to work in contact with a roller $b$ situated above the cam $a$ and by the revolution of the cam, which in this embodiment is of the snail type, the slide $c$ is actuated up and down. In the lower part of the slide $c$ is provided a gap into which the two adjacent parts of the punch $d$ and $e$ are clamped by the aid of the plate $f$ and the screws $g$. Near this gap a boring $i$ is located adapted to receive the wedges $h^1$, $h^{11}$, disposed transversely through the slide. The wedges lie against the edges of the correspondingly sloped punch parts $d$ and $e$ and are rigidly fixed by screw bolts $k$. By the use of a punch of this construction it is possible to adjust each part to its proper height for acting upon the teeth of a saw. The die located below the slide is similarly constructed.

The die shoe has a gap therein similar to that provided in the slide $c$ and into this gap the parts $d^1$, $e^1$ constituting the die tools are clamped by the aid of the plate $l$ and the screws $m$. Disposed below said parts is a boring $o$ transversely located to the gap aforesaid which boring serves to accommodate the wedges $n^1$, $n^{11}$ which are adapted to be clamped by the screw-bolts $p$ so that the two parts $d^1$, $e^1$ constituting the die can be adjusted independently of each other.

The tools constituting the die and those disposed below constituting the punch are arranged in such relation that when the slide $c$ descends through the revolution of the cam $a$ acting upon the roller $b$ one tooth on a saw is struck in an upward direction by the one pair of tools and the adjacent tooth is struck in a downward direction.

The construction of the die and the punch each being in two parts provides a very simple means for the purpose of saw setting and moreover any slight inexactitude can be quickly corrected by means of the wedges hereinbefore described so that an even setting can be continuously provided.

What we claim is:

1. A saw setting machine comprising in combination a vertical frame, a slide member arranged therein, means for reciprocating the slide member, a punch carried by the slide member consisting of two removable parts, a die shoe arranged below the slide member, a die consisting of two removable parts disposed within the die shoe characterized in that by the operation of the punch upon a saw interposed between it and the die adjacent teeth are displaced to the left and right by a single passage of the saw through the machine.

2. A saw setting machine comprising in combination a frame, a slide member vertically arranged therein, means for reciprocating the slide, two removable parts arranged in the slide constituting a punch, two removable parts housed within a die shoe constituting a die, there being a gap located in the slide to receive the parts constituting the punch, there being a gap located in the die shoe to receive the part constituting the die, means for clamping both the punch and the die to the slide and shoe respectively, there being a transverse bore opening into each of said gaps, wedges located in said borings to lie against the shaped edges of the parts constituting the punch and die and means for clamping the wedges so that each may be independently adjustable substantially as described.

In testimony whereof we have signed our names to this specification.

FRITZ KOCH.
RICHARD POHLMANN.